(12) United States Patent
Lysen

(10) Patent No.: US 6,591,218 B1
(45) Date of Patent: Jul. 8, 2003

(54) PROCESS FOR DETERMINING THE ALIGNMENT OF A CYLINDRICAL BODY WITH RESPECT TO A REFERENCE DIRECTION

(75) Inventor: Heinrich Lysen, Garching (DE)

(73) Assignee: Pruftechnik Dieter Busch AG, Ismaning (DE)

( * ) Notice: Subject to any disclaimer, the term of this patent is extended or adjusted under 35 U.S.C. 154(b) by 110 days.

(21) Appl. No.: 09/690,888

(22) Filed: Oct. 18, 2000

(51) Int. Cl.$^7$ ............................................. G01C 17/00
(52) U.S. Cl. .......................... 702/151; 702/94; 702/95; 702/150; 33/281; 33/286
(58) Field of Search .......................... 702/94, 95, 104, 702/145, 147, 150–151, 155, 158; 73/1.38, 1.77, 1.78, 1.79; 33/281, 282, 285, 28, 383

(56) References Cited

U.S. PATENT DOCUMENTS 5,026,998 A    6/1991   Hölzl 5,579,585 A    12/1996  Schaeffer

FOREIGN PATENT DOCUMENTS

| DE | 197 10 837 | 6/1998 |
|----|------------|--------|
| EP | 0 928 951 A2 | 7/1999 |
| EP | 1 092 947 A2 | 4/2001 |
| JP | 10-160432 A | 6/1998 |
| WO | WO 99/64818 | 12/1999 |

*Primary Examiner*—Bryan Bui
(74) *Attorney, Agent, or Firm*—Nixon Peabody LLP; David S. Safran

(57) ABSTRACT

A process for determining the alignment of a cylindrical body (10) with respect to a reference direction (18), by a position measurement probe (14) which is calibrated to the reference direction, a first position measurement being taken in a first measurement position on the peripheral surface (12) of the body and a second position measurement being taken in at least one second measurement position on the peripheral surface of the body which is displaced by an angle of rotation ($\phi$) in the peripheral direction with respect to the axis of the body from the first measurement position, and from the measurements data is calculated with respect to the alignment of the body with respect to the reference direction.

19 Claims, 3 Drawing Sheets

PROCESS FOR DETERMINING THE ALIGNMENT OF A CYLINDRICAL BODY WITH RESPECT TO A REFERENCE DIRECTION

BACKGROUND OF THE INVENTION

1. Field of the Invention

This invention relates to a process for determining the alignment of a cylindrical body, especially a shaft or roller, with respect to a reference direction which is dictated especially by another roller or shaft.

2. Description of Related Art

Published German Patent Application DE 195 46 405 A1 (corresponding to Published International Application WO/9721980 and U.S. patent application Ser. No. 09/077,887) discloses a process for parallel alignment of shafts or rollers, a position measurement probe being used which comprises at least one optical gyro and which is provided with a contact surface for defined attachment to the body to be aligned which has two planar flat sections which include a flat angle relative to one another. Furthermore, the position measurement probe is provided with a double acting inclinometer for fixing the angular position of the position measurement probe with reference to the vertical. In the determination of the alignment of two bodies relative to one another, the process lies in that, first of all, by attaching the position measurement probe to the first body in a stipulated first measurement plane, a reference position is determined, and then, within a stipulated time interval after determination of the reference position, the location of the second body in a plane which agrees with the first measurement plane or which is parallel to it is determined by means of attachment of the position measurement probe to the second body. If necessary, other position measurements of this type, i.e., a reference position determination on the first body with subsequent position measurement on a second body, can be taken in a second measurement plane which includes a defined angle, for example, 90°, with the first measurement plane. The respective measurements are taken by the position measurement probe, if the bodies to be aligned are shafts or rollers, being manually attached to the peripheral surface of the shafts or rollers.

Japanese Laid-open patent application S60-158310 discloses an angle measurement method and device for measuring the angle between two planes that form two mutually separate structures in constructions sites, shipbuilding yards and the like. In the disclosed method and device, angular velocities are sensed by mechanical gyros, and resultant angular velocity signals are integrated to convert them into angles. However, mechanical gyros do not produce a high degree of precision, and there is no disclosure as to if or how the method and device might be applied to cylinders or rolls.

In cylindrical bodies with a large diameter, as a result of the practical limitation of the dimensions of the position measurement probe to be attached and the resulting limited size of the attachment or contact surface of the position measurement probe, the problem arises that the orientation of the position measurement probe with respect to rotation around an axis which is perpendicular to the lengthwise axis of the cylindrical body and perpendicular to the peripheral surface is not determined very accurately by the geometry of the peripheral surface and the contact surface, i.e., for example, for a horizontal roller, when the position measurement probe is attached to the top of the roller, the angle of elevation of the position measurement probe is determined relatively accurately by mechanical contact, but not the azimuth angle. To increase the accuracy of the azimuth angle of the position measurement probe in this case, the distance between the two attachment edges of the contact surface and/or its length would have to be increased; however, this is essentially limited for reasons of cost and manageability.

Japanese Laid-open patent application S60-158310 discloses an angle measurement method and device for measuring the angle between two planes that form tow mutually separate structures in constructions sites, shipbuilding yards and the like. In the disclosed method and device, angular velocities are sensed by mechanical gyros, and resultant angular velocity signals are integrated to convert them into angles. However, mechanical gyros do not produce a high degree of precision, and there is no disclosure as to if or how the method and device might be applied to cylinders or rolls.

SUMMARY OF THE INVENTION

The primary object of this invention is to devise a process for determining the alignment of a cylindrical body with reference to a reference direction, which can be done easily and economically, and yet can still yield results with sufficient accuracy even for bodies with very large diameters.

This object is achieved as in accordance with the invention by a process in which, by means of a position measurement probe which is calibrated with respect to a reference direction, a first position measurement is taken at a first measurement position on a peripheral surface of a cylindrical body, and at least one second measurement is taken at least one second position on the peripheral surface of the body which is displaced from the first measurement position by an angle of rotation in the peripheral direction with respect to the axis of the body, and from the measurements taken, the alignment of the body with respect to the reference direction is calculated. In this approach according to the invention, it is advantageous that, by taking into account at least the second measurement position on the peripheral surface of the body with respect to another axis of rotation, the accuracy of the measurement is easily improved overall.

The invention is detailed below using the attached drawings.

DETAILED DESCRIPTION OF THE INVENTION

Figure 1:
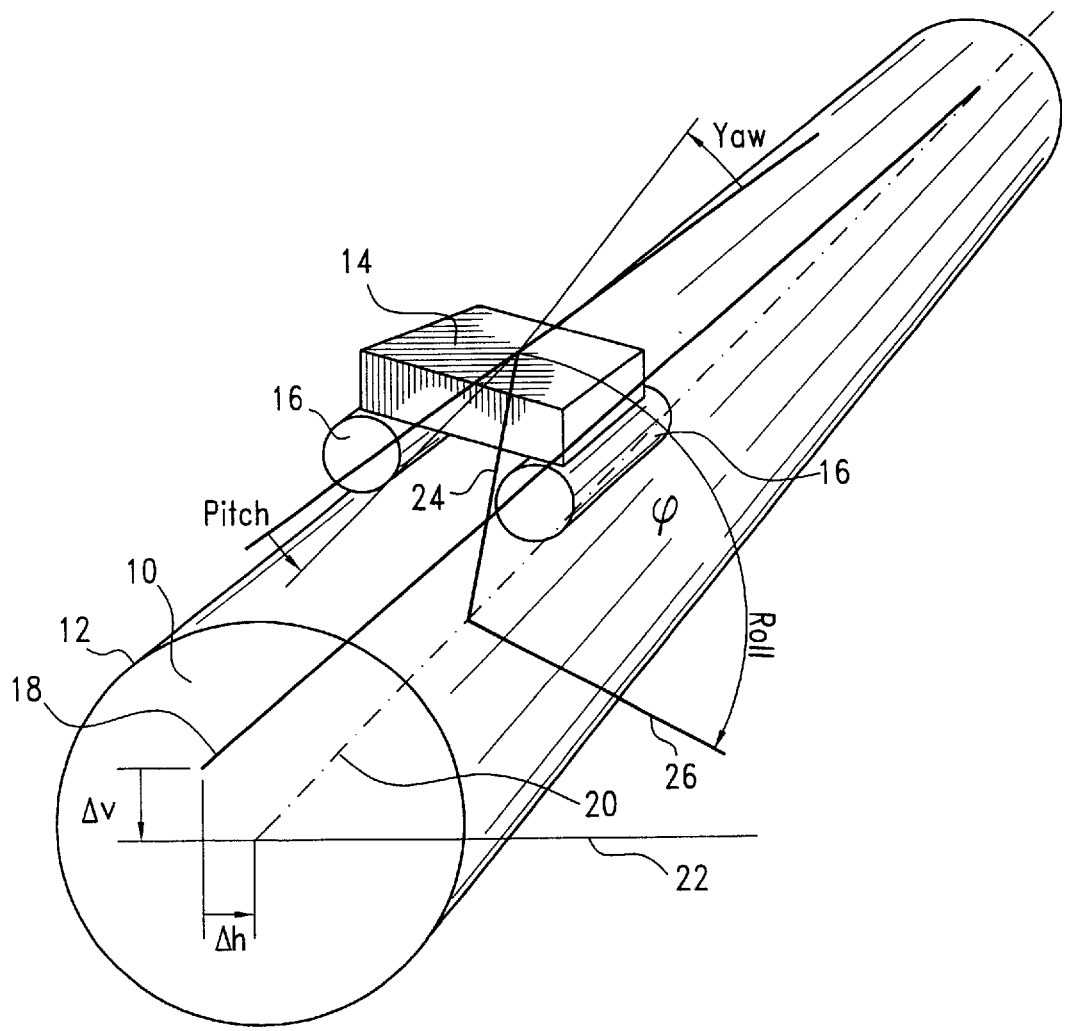
FIG. 1 is a schematic perspective view of a roller with an attached position measurement probe.

FIG. 1 shows an essentially horizontal roller 10 with a peripheral surface 12 with a position measurement probe 14 attached to its top. The position measurement probe has a contact surface or attachment surface on its bottom which is formed, in the arrangement shown in FIG. 1, by two elongated cylinders 16 which are located at a certain distance apart, parallel to one another, so that essentially the probe 14 is in mechanical contact with the peripheral surface 12 of the roller along two parallel lines. Preferably, the probe 14 is provided with three optical gyros, preferably, fiberoptic laser gyros which each form an optical ring, each optical gyro acquiring one rotation around an axis perpendicularly to that of its ring plane. The three ring planes of the three gyros can be perpendicular to one another.

A reference direction with respect to which the alignment of the roller 10 will be determined is labeled 18 in FIG. 1, and as a result of the alignment measurement, the horizontal inclination Δh and the vertical inclination Δv of the roller axis 20 will be acquired with respect to the reference direction 18. The reference direction 18 is dictated, for example, by the orientation of the axis of a second roller or shaft which is roughly, but not exactly positioned generally parallel with respect to roller 10.

Before the start of the measurement, the probe 14 is calibrated with respect to the reference direction 18, then one of the optical gyros of the probe 14 acquires a first inclination angle of the probe 14 and another optical gyro acquires a second inclination angle of the probe 14 with respect to the reference direction 18, the first inclination angle indicating the angle of rotation of the probe around a first direction 24 which is perpendicular to the reference direction 18 and the second inclination angle indicating the angle of rotation of the probe around a second direction 26 which is perpendicular to the reference direction 18 and the first direction (the reference direction is used as the zero point for the first and the second inclination angles). Hereinafter, the first inclination angle of the probe 14 will be called the radial angle, while the second inclination angle of the probe 14 will be called the tangential angle. The third optical gyro of the probe 14 finally acquires the angle of rotation of the probe 14 around the reference direction 18. Here, the direction 24 which is perpendicular with respect to the reference direction 18 is used as the zero point, in FIG. 1 and 2 this direction being formed by the vertical line. The angle by which the probe is turned around the reference direction 18 with respect to this direction, i.e., the vertical line, is hereinafter called the roll angle. Therefore, in the following, the terms radial, tangential and roll angle will designate the instantaneous or current rotation of the position measurement probe around three axes which are perpendicular to one another and which are stationary in the coordinate system of the position measurement probe 14.

In the embodiment of the probe 14 which is shown in FIG. 1, the probe can be moved based on the contact surface cylinder 16 only on the peripheral surface 12 of the roller 10, but cannot be turned or inclined relative to the peripheral surface 12, i.e., the probe 14 can be pushed after attachment to the roller 10 only in the lengthwise direction of the roller and in the peripheral direction of the roller 10, but is otherwise fixed in its orientation with respect to the roller 10. However, this described geometrical fixation, as a result of surface unevenness, dirt, mechanical elasticity, etc. applies only approximately, the resulting errors at small roller diameters relating essentially to the radial angle of the probe, while at large roller diameters they relate essentially to the tangential angle of the probe.

Aside from these contact errors, the position of the probe 14 with respect to the shaft 10 is fixed essentially by the angle on the periphery 12 with respect to the roller axis 20 (the displacement along the roller axis 20 can be ignored for the current purposes). This angle is labeled the "angle of rotation φ" below.

As shown in FIG. 1, the probe 14 essentially adjoins the roller 10 such that, in the case of relatively small misorientations, Δv and Δh of the roller 10 with respect to the reference direction 18 (which represents the case relevant to practice), the roll angle corresponds essentially to the angle of rotation φ (with the same calibration), i.e., the roll angle indicates the rotation of the probe 14 around the axis 18 which is roughly parallel to the roller axis 20, while the radial angle indicates the rotation of the probe 14 around an axis 26 which runs tangentially with respect to the peripheral surface 12 and which is essentially perpendicular to the roller axis 20, and the tangential angle indicates the rotation of the probe 14 around an axis 24 which is perpendicular to the peripheral surface 12 and which is essentially perpendicular to the roller axis 20. Since the radial angle and the tangential angle are defined as rotations around the axes which are stationary in the coordinate system of the probe, the two latter axes turn at the same time with the angle of rotation φ (i.e., the roll angle of the probe). The radial angle and the tangential angle thus change with the roll angle of the probe 14 if there is misalignment of the roller 10 with respect to the reference direction 18.

The measurement process according to the invention is based essentially on the knowledge that, for measurement positions with different angles of rotation φ, different measurement accuracies occur for the vertical and horizontal misotientation Δv and Δh of the roller 10 with respect to the reference direction 18. Thus, in principle, both the vertical and horizontal misorientation Δv and Δh can be determined from a single measurement, for example, in the position shown in FIG. 1, assuming that the probe 14 is exactly overhead (top dead center) on the roller 10, i.e., the roll angle with respect to the horizontal line 22 is exactly 0°, the measured radial angle corresponding to the vertical misorientation Δv and the measured tangential angle corresponding to the horizontal misorientation Δh. For a roller diameter which is large relative to the dimensions of the probe 14, as a result of surface unevenness and the like, the tangential angle correlates rather poorly with the corresponding roller orientation, while the radial angle correlates rather well with the roller orientation. Accordingly, in the measurement position shown in FIG. 1, the direct measurement of the horizontal misorientation Δh over the tangential angle is subject to a relatively large measurement error, while the vertical misorientation Δv can be measured relatively accurately.

The measurement process according to the invention is based essentially on the knowledge that, for measurement positions with different angles of rotation φ, different accuracies are obtainable due to the vertical and horizontal misorientation Δv and Δh of the roller 10 with respect to the reference direction 18. Thus, in principle, both the vertical and horizontal misorientation Δv and Δh can be determined from a single measurement, for example, in the position shown in FIG. 1, assuming that the probe 14 is exactly overhead (top dead center) on the roller 10, i.e., the roll angle with respect to the horizontal line 22 is exactly 0°, the measured radial angle corresponding to the vertical misorientation Δv and the measured tangential angle corresponding to the horizontal misorientation Δh. For a roller diameter which is large relative to the dimensions of the probe 14, as a result of surface unevenness and the like, the tangential angle correlates rather poorly with the corresponding roller orientation, while the radial angle correlates rather well with the roller orientation. Accordingly, in the measurement position shown in FIG. 1, the direct measurement of the horizontal misorientation Δh over the tangential angle is subject to a relatively large measurement error, while the vertical misorientation Δv can be measured relatively accurately.

Figure 2:
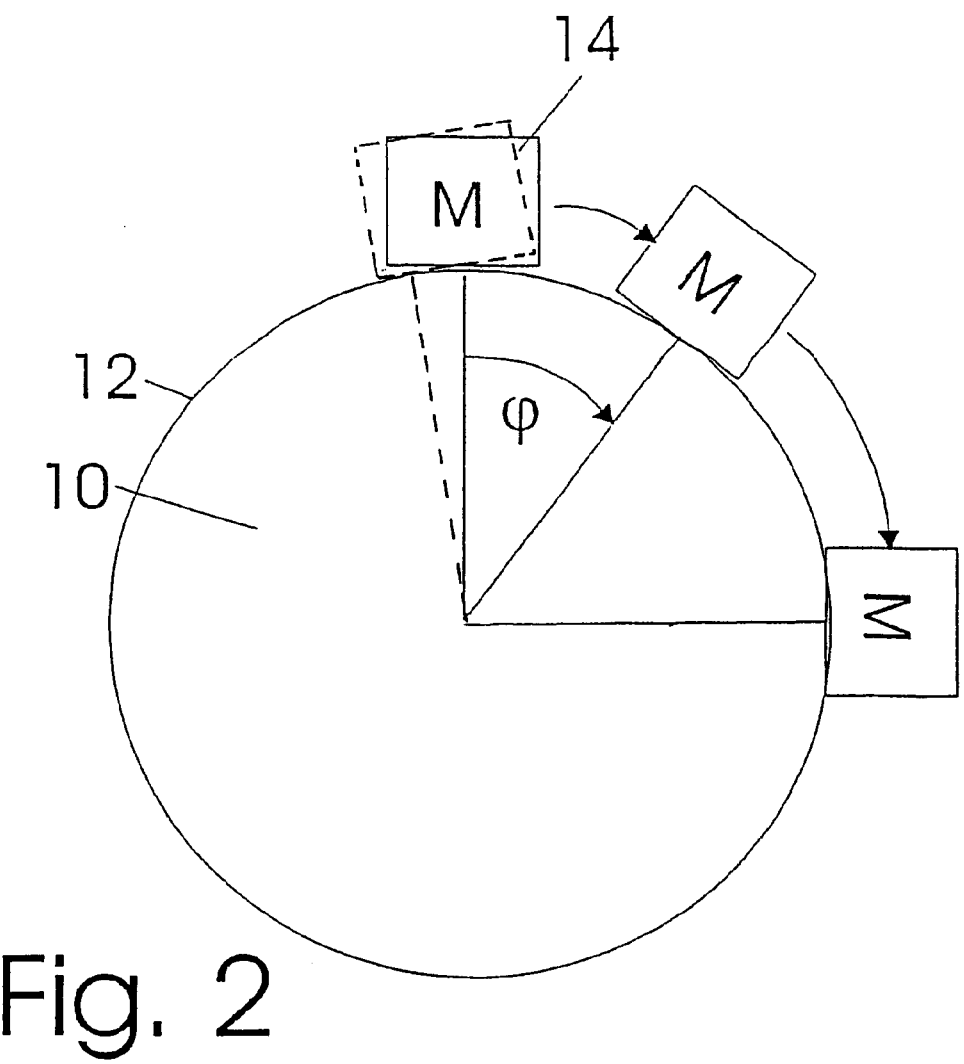
FIG. 2 is a schematic cross-sectional view of a roller with an attached position measurement probe in different measurement positions.

However, here the difference of angles of rotation need not necessarily be 90°. Rather, measurements can also be taken in intermediate positions. In particular, the measurement positions can be distributed uniformly over a stipulated area of the angle of rotation, as is illustrated in FIG. 2. Here, the measurement probe 14 can be individually attached to the different measurement positions, or it can be moved into the individual measurement positions after the first attachment by manual displacement along the peripheral direction of the roller 10. Alternatively, before the start of the measurement, it is also possible to attach the probe 14 securely to the peripheral surface 12 of the roller, and then, in this way, to move it into the different measurement positions by turning the roller 10 around its axis 20.

In each measurement position, the probe 14 acquires at least the roll angle and the radial angle, the roll angle in the simplest case being set equal to the angle of rotation, and thus, the dependency of the radial angle on the angle of rotation being determined for the individual measurement positions. From these measured values, which relate to the coordinate system of the probe 14, by means of a suitable coordinate transformation into the coordinate system of the roller 10, i.e., the system, for example, of the factory building, the desired vertical and horizontal misorientation $\Delta v$ and $\Delta h$ of the roller 10 can be determined. In the simplest case, this takes place by using the two dimensional rotation matrix with a measured roll angle as the angle of rotation.

$$\text{radi}=\cos(\text{roll})\Delta v+\sin(\text{roll})\Delta h \tag{1}$$

$$\text{tang}=\sin(\text{roll})\Delta v+\cos(\text{roll})\Delta h \tag{2}$$

radi=radial angle
tang=tangential angle
roll=roll angle

Equation (1) indicates the relationship between the radial angle and the roll angle for a certain $\Delta v$ and $\Delta h$. Thus, basically, the desired $\Delta v$ and $\Delta h$ can be determined from the two measurements of the radial angle for two different roll angles (i.e., angles of rotation). When only two measurements are taken, $\Delta v$ and $\Delta h$ can be determined with maximum accuracy if the two measurement positions differ by 90°. Basically, the accuracy of $\Delta v$ and $\Delta h$ increases with the number of different measurement positions. In this case, it is feasible to determine $\Delta v$ and $\Delta h$ by using optimization processes, such as curve matching or compensation calculation, for example, square error minimization. Since the measured values are generally rather inaccurate for the tangential angle for the indicated reasons, they are generally not used for determination of $\Delta v$ and $\Delta h$.

Figure 3:
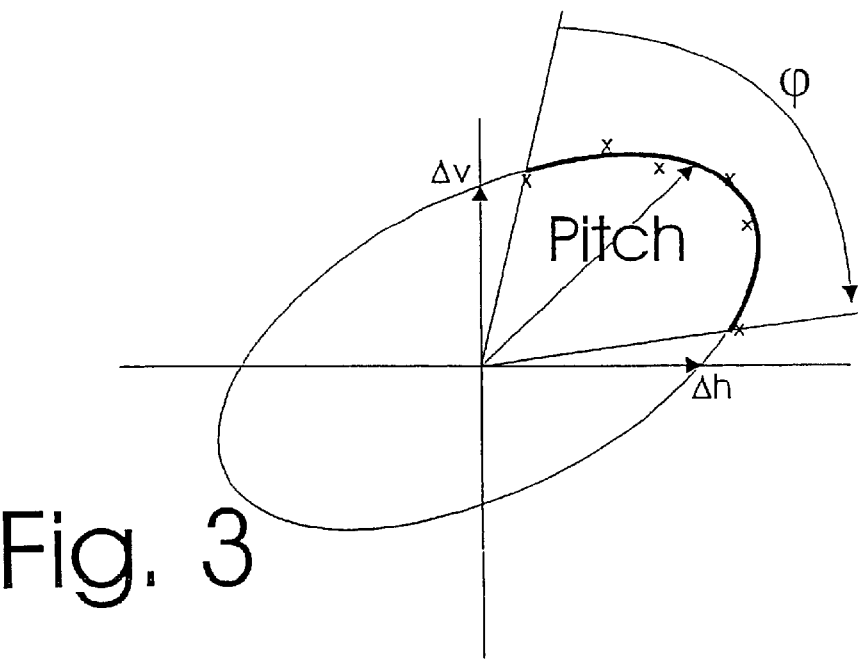
FIG. 3 shows an example evaluation of measurement results in a polar coordinate representation.
Figure 4:
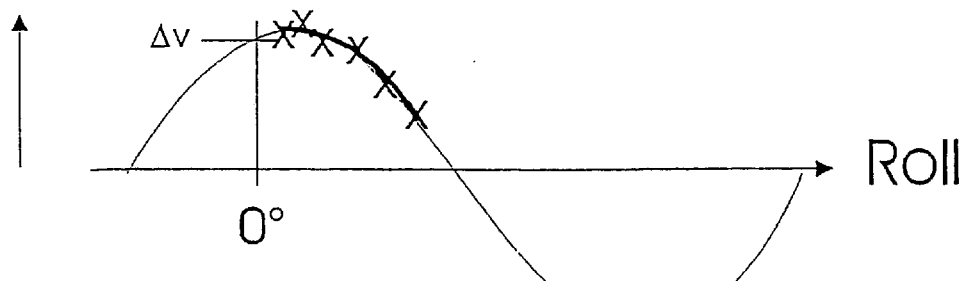
FIG. 4 shows a representation which is an alternative to the one shown in FIG. 3.
Figure 4:
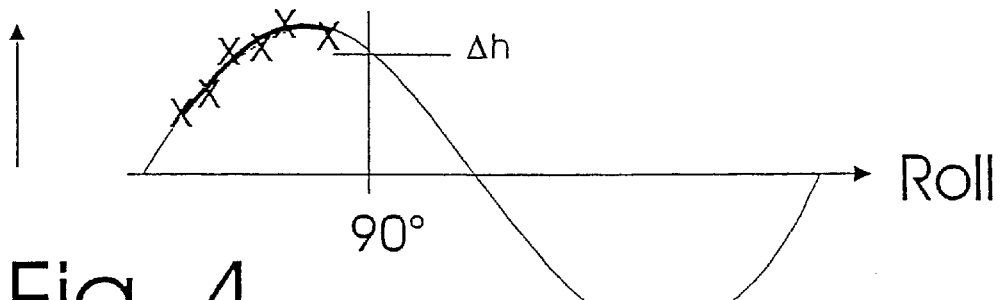

A schematic example for this case is shown in FIG. 3, where the relationship between the measured radial angle and the roll angle or the angle of rotation $\phi$ is shown in polar coordinates for a certain vertical and horizontal misorientation $\Delta v$ and $\Delta h$ of the roller. In Cartesian coordinates, thus, x is set equal to cos(roll) x radi and v is set equal to sin(roll) x radi. For relatively small misorientations of $\Delta v$ and $\Delta h$, roughly an ellipse is formed as the geometrical location on which these quantities would lie with a continuous measurement over an angle of rotation of 360°. The actual measured values of the radial angle at different roll angles are scattered within the framework of the measurement error around the curve which is theoretically stipulated by a certain $\Delta v$ and a certain $\Delta h$ (here an ellipse). Therefore, by using optimization methods, especially curve matching or a compensation calculation using the least squares method, the geometrical location can be determined on which the measurement data would lie with continuous measurement over a roll angle or an angle of rotation of 360°, i.e., the result is the parameters of the ellipse which best fits the measured values. From the curve parameters determined in this way, conclusions can now be drawn about the misorientation $\Delta v$ and $\Delta h$ underlying the determined curve (in FIG. 3 $\Delta v$ and $\Delta h$ are formed as the value at 0° and 90°). FIG. 4 shows an alternative representation to FIG. 3 in which the value of the radial angle times cos ($\phi$) or the radial angle times sin ($\phi$) is plotted in Cartesian coordinates over the roll angle.

Another type of evaluation consists in that equation (1) passes into $$\text{radi}=A\times\sin(\text{roll}+\Delta\phi) \tag{3}$$

with tan: $(\Delta\phi)=\Delta v/\Delta h$ and
$A=\sqrt{\Delta v^2+\Delta h^2}$
$A=\sqrt{\Delta v^2+\Delta h^2}$ Here too, in principle, two pairs of values for the radial angle and the roll angle are sufficient to determine A and $\Delta\phi$, from which then in turn the desired $\Delta v$ and $\Delta h$ can be determined. More accurate results can be obtained when several measurements are taken and evaluated over an area of the roll angle or angle of rotation $\phi$ which is as large as possible in order to determine A and $\Delta\phi$; this then takes place more feasibly by compensation calculation.

The above described simple model, however, only applies as long as the tangential angle is relatively small, i.e., as long as the tangential angle through a correspondingly shaped contact surface of the probe 14 is fixed relatively accurately by the application of the probe 14 to the roller periphery 12 by the roller orientation. However, as mentioned above, under certain circumstances, mainly for large roller diameters, this requires a complex and unwieldy configuration of the probe 14. The above described measurement process can, however, fundamentally also be used for cases in which the tangential angle is more or less undefined even after the probe 14 is applied to the roller 10, and therefore, can also assume relatively large values. But in this case, the tangential angle must be acquired at the same time for each measurement in addition to the radial angie and the roll angle. The tangential angle measured at the time is then used, if necessary, to convert the measured radial angle and the measured roll angle into a radial angle corrected accordingly with respect to the measured tangential angle and a corrected roll angle, these corrected values then being subjected to the above described evaluation instead of the measured values. The corrected values are determined from a corresponding coordinate transformation.

Accordingly, since as long as the tangential angle is measured by the probe 14, it need not be fixed by the attachment of the probe to the roller periphery 12, the contact surface of the probe 14, in the external case, can be made simply as a flat surface so that as the contact area between the probe 14 and the peripheral surface 12 of the roller is essentially only a straight line which lies in the peripheral surface 12 and is oriented parallel to the roller axis 20. In this case, the orientation of the probe 14 is fixed only in one spatial direction, specifically along the roller axis 20, by application to the roller periphery 12. This embodiment of the measurement probe 14 is shown schematically in FIG. 2, the broken lines indicating rolling of the probe 14 on the periphery 12 of the roller 10; this leads to a changed angle of rotation $\phi$.

Inclining of the probe 14 around the roller axis 20, i.e., rolling of the probe 14 on the roller periphery 12, corresponds essentially to the transfer to a new measurement position with a correspondingly different angle of rotation $\phi$, while turning of the probe 14 at the contact site around the axis which passes through the contact line and which is perpendicular to the roller axis 20, i.e., a change of the tangential angle, can be compensated by measurement of the tangential angle and taking into account the effect of the tangential angle on the importance of the radial angle and the roll angle with respect to the orientation of the roller 10 by computing the corrected roll angle and the corrected radial angle. Therefore, in this embodiment, a much simplified contact surface for the probe 14 can be used.

This embodiment of the probe 14 is based on the general concept that, from complete knowledge of the location of the probe 14 in space with respect to the reference directions 18 and 22 in the coordinate system of the probe 14 (by measuring the radial, tangential and roll angle), the knowledge of the shape of the body (cylinder surface) to be measured, and the knowledge that the probe 14 in each measurement position lies on the cylinder surface 12, via corresponding coordinate transformations, the vertical and horizontal misorientations $\Delta v$ and $\Delta h$ of the roller 10 can also be determined for an "undefined" tangential angle. Here, it is decisive that the evaluation of the measurement data takes place in a favorably chosen coordinate system, this taking place otherwise as described above, preferably by curve matching or compensation calculation with theoretically determined curves. Therefore, if necessary, in contrast to the first embodiment, the measured radial, tangential and roll angle must be transformed into the corresponding coordinate system before evaluation according to the above described geometrical boundary conditions.

In the past, the case was examined that the probe directly yields the measured values which are desired for the evaluation for the radial angle (and optionally the tangential angle). But, this is often not the case in commercial position measurement probes. Rather, the position measurement probe on a standard basis often does not output the actual measured value for the radial angle and the tangential angle, but by means of the measured roll angle, stipulates a transformation of the measurement results from the coordinate system of the probe into the laboratory coordinate system (i.e., the coordinate system of the factory building) and then outputs these transformed values which are ordinarily called the pitch angle and the yaw angle, and in this case, would correspond to $\Delta v$ and $\Delta h$ (however, the roll angle is not transformed and corresponds to the previously examined roll angle). These pitch angles and yaw angles which are output by the probe would change for measurements at different roll angles or angles of rotation $\phi$ only within the framework of the measurement error, while the above defined radial angle or tangential angles systematically depend on the roll angle or the angle of rotation $\phi$ according to equation (1) and (2).

Therefore, in order to be able to determine the desired misorientation $\Delta v$ and $\Delta h$ in the manner described above, it is necessary to undo the unwanted coordinate transformation by the probe in order to determine, for each measurement, from the values output by the probe for the pitch angle, the yaw angle and the roll angle and at least the pertinent radial angle (the tangential angle is generally much less accurate and is therefore generally not of interest). Here, the following applies:

$$\text{radi} = \cos(\text{roll}) \times \text{pitch angle} + \sin(\text{roll}) \times \text{yaw angle} \quad (4)$$

$$\text{radi} = \sin(\text{roll}) \times \text{pitch angle} + \cos(\text{roll}) \times \text{yaw angle} \quad (5)$$

radi=radial angle
tang=tangential angle
roll=roll angle

The radial angles computed for each measurement by means of equation (4) can then be evaluated in the above described manner in order to determine the misorientation $\Delta v$ and $\Delta h$ via the equation (1).

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Process for determining the alignment of a cylindrical body, with respect to a reference direction, by means of a position measurement probe which is calibrated with respect to the reference direction, comprising the steps of:

taking a first position measurement at a first measurement position on a peripheral surface of the cylindrical body, taking a second position measurement at least one second measurement position on the peripheral surface of the body which is displaced from the first measurement position by an angle of rotation in the peripheral direction with respect to the axis of the body; and determining the orientation of the body with respect to the reference direction from the measurements taken.

2. Process as claimed in claim 1, wherein the first and second measurement positions are roughly 90° apart.

3. Process as claimed in claim 1, wherein a plurality of second measurement positions are essentially uniformly distributed over a predetermined area of the angle of rotation.

4. Process as claimed in claim 1, wherein the alignment of the body is determined by using optimization methods.

5. Process as claimed in claim 1, wherein the optimization methods comprise one of curve matching and compensation calculations using measurement data obtained from the measurements taken.

6. Process as claimed in claim 5, wherein, by using said optimization methods, a geometrical location is determined on which the measurement data would lie with a continuous measurement over an angle of rotation of 360°; and wherein the alignment of the body is determined from parameters of the geometrical location determined.

7. Process as claimed in claim 1, wherein the position measurement probe acquires its rotation around three axes which are essentially perpendicular to one another and which are stationary in a coordinate system of the position measurement probe as radial, tangential and roll angles with respect to the reference direction; wherein the position measurement probe in the measurement positions lies on the body such that the roll angle indicates essentially the rotation of the probe around an axis roughly parallel to the axis of the body, the radial angle indicates the rotation of the probe around an axis which is essentially perpendicular to the axis of the body and which runs tangentially with respect to the peripheral surface and the tangential angle indicates the rotation of the probe around an axis which is essentially perpendicular to the axis of the body and the peripheral surface, the orientation of the axes for the radial angle and the tangential angle turning with the roll angle.

8. Process as claimed in claim 7, wherein the position measurement probe in each measurement determines from the measured radial, tangential and roll angle, by coordinate transformation into the coordinate system of the reference direction, a pitch angle and a yaw angle which correspond to the vertical and horizontal inclination of the probe and outputs them instead of the measurement results for the radial angle and the tangential angle, at least the radial angle being determined by the inverse transformation.

9. Process as claimed in claim 7, wherein in each measurement position, the radial angle is acquired and the alignment of the body is determined from the relationship between the radial angle and the angle of rotation.

10. Process as claimed in claim 9, wherein, in each measurement position, the respective angle of rotation is assumed to be the roll angle acquired by the position measurement probe.

11. Process as claimed in claim 9, wherein, with respect to the each measurement position, the position measurement probe if fixed against significant rotation and inclination with respect to the peripheral surface of the body.

12. Process as claimed in claim 11, wherein the position measurement probe is securely attached to the body before measurement and is moved into the respective measurement position by rotation of the body around its axis.

13. Process as claimed in claim 7, wherein, in each measurement position, the roll angle, the radial angle and the tangential angle are acquired in order to compute a corrected radial angle which corresponds to the angle of rotation, said corrected radial angle being used instead of the measured values in computing the alignment of the body.

14. Process as claimed in claim 13, comprising the steps of using the tangential angle to compute the corrected radial angle from the measured radial angle and computing the corrected roll angle from the measured roll angle.

15. Process as claimed in claim 14, wherein the position measurement probe is moved into the individual measurement positions by manual attachment.

16. Process as claimed in claim 15, wherein an attachment side of the position measurement probe is made such that the position measurement probe, after attachment to the periphery of the body, is movable only in a lengthwise direction of the cylindrical body and in the peripheral direction of the body, is otherwise fixed in its orientation with reference to the body.

17. Process as claimed in claim 16, wherein the attachment side of the position measurement probe has two parallel attachment surfaces which are located at a distance from one another.

18. Process as claimed in claim 13, wherein an attachment side of the position measurement probe is made as an essentially flat surface.

19. Process as claimed in claim 1, wherein the position measurement probe contains at least one optical laser gyro.

* * * * *